Feb. 27, 1973   R. A. BERKOVITZ   3,718,773
FOUR CHANNEL RECORDING AND REPRODUCING SYSTEM
Filed May 18, 1970   3 Sheets-Sheet 1
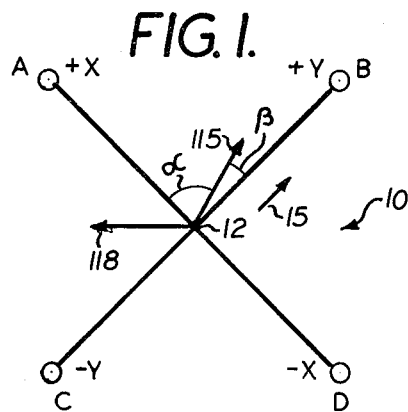
FIG. 1.
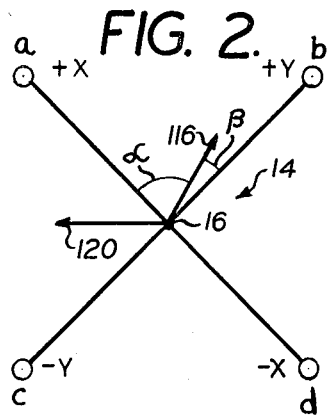
FIG. 2.
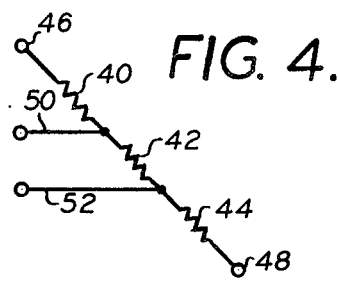
FIG. 4.
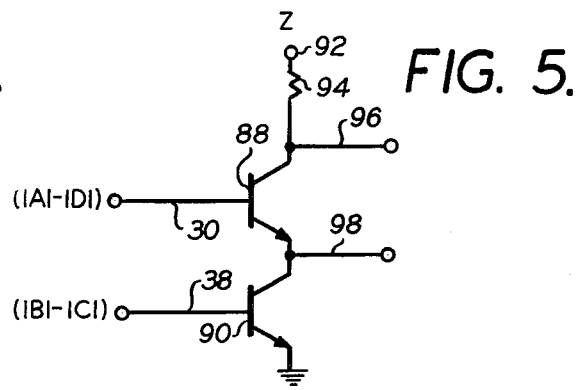
FIG. 5.
FIG. 6.
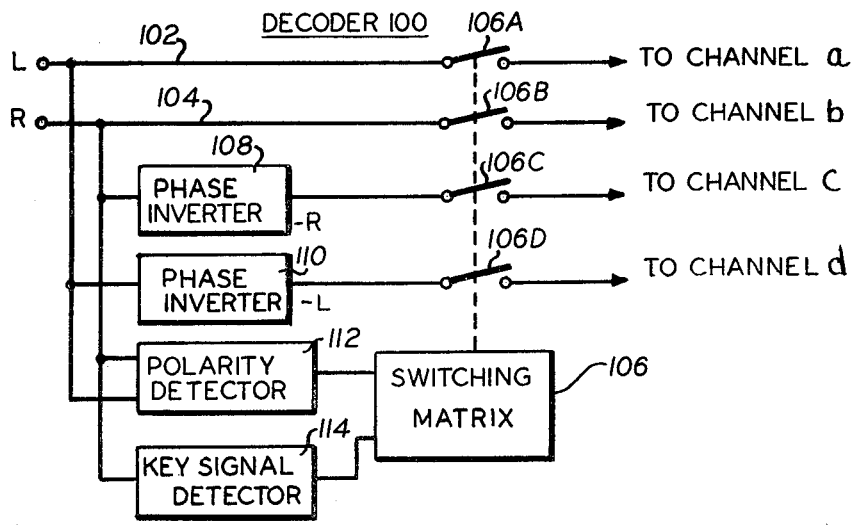
INVENTOR
ROBERT A. BERKOVITZ
BY
Burgess, Dinklage + Sprung
ATTORNEYS.

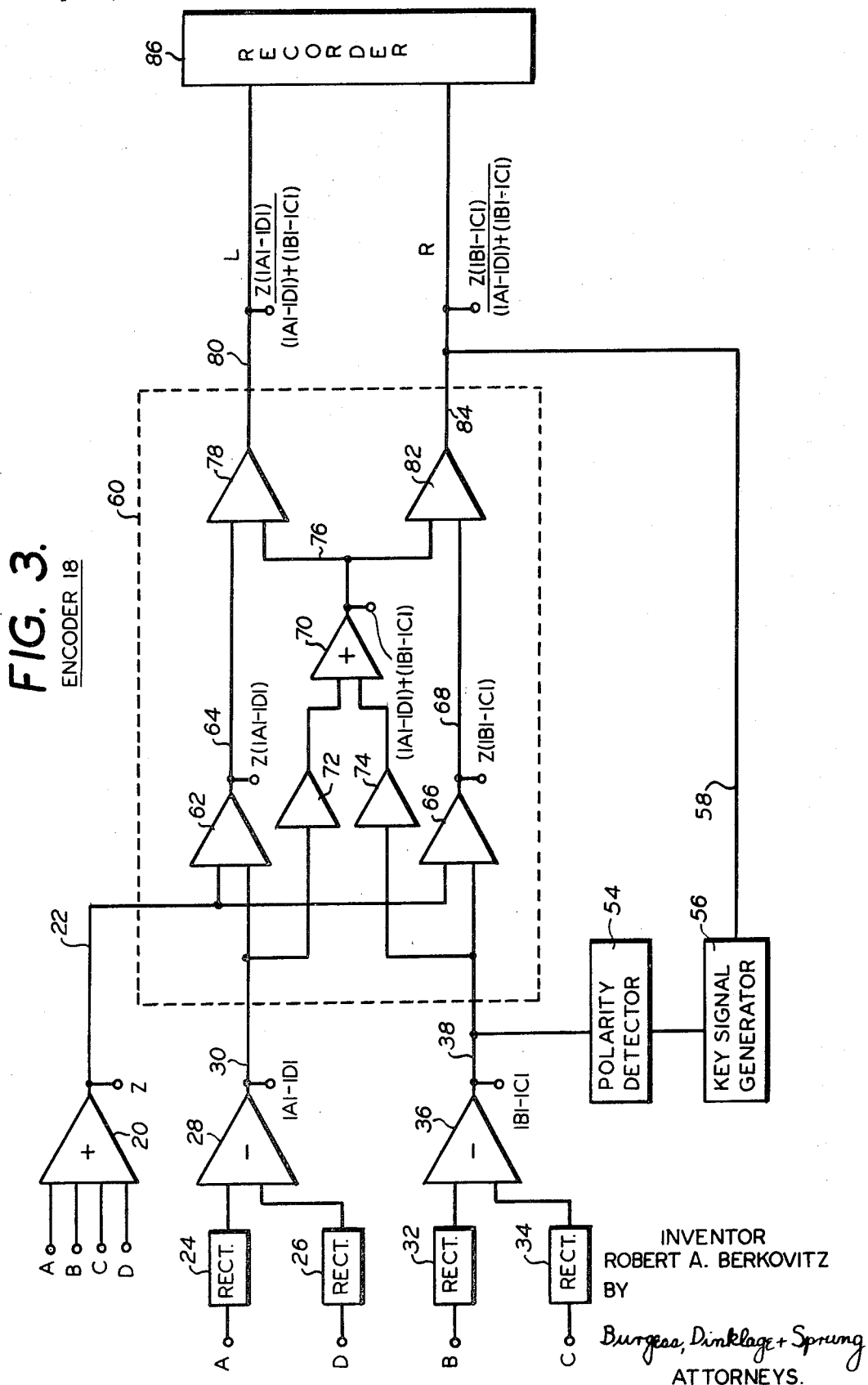

Feb. 27, 1973   R. A. BERKOVITZ   3,718,773
FOUR CHANNEL RECORDING AND REPRODUCING SYSTEM
Filed May 18, 1970   3 Sheets-Sheet 3
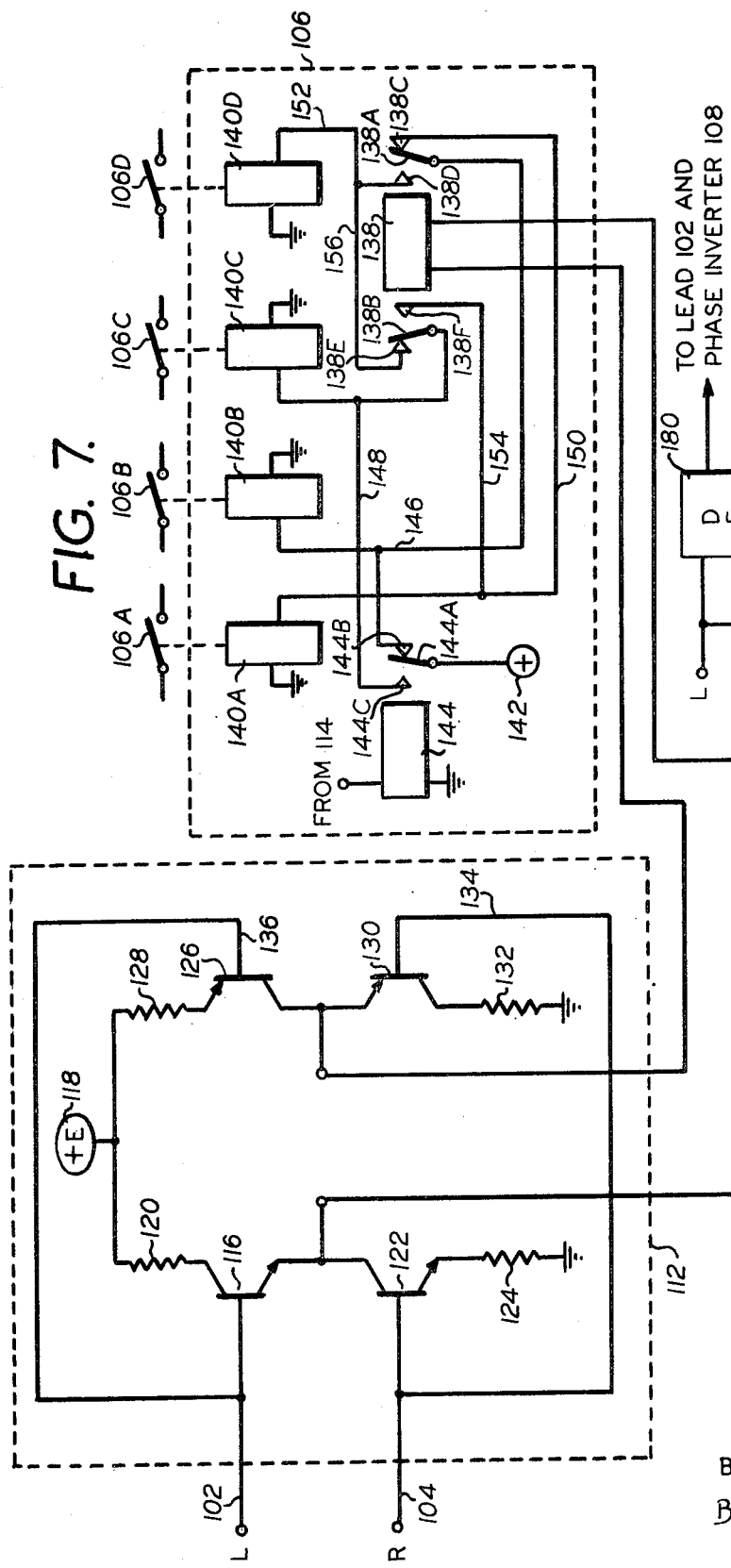
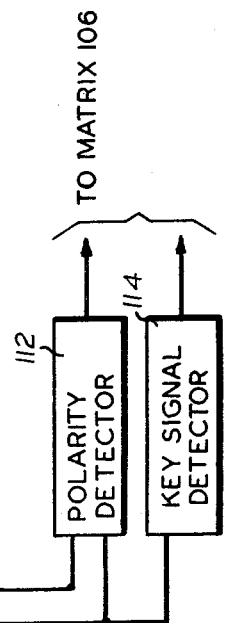
INVENTOR
ROBERT A. BERKOVITZ
BY
Burgess, Dinklage + Sprung
ATTORNEYS.

United States Patent Office
3,718,773
Patented Feb. 27, 1973

3,718,773
FOUR CHANNEL RECORDING AND REPRODUCING SYSTEM
Robert A. Berkovitz, Lexington, Mass., assignor to Russell D. Barnard, John Killion, Norman Dolph, and Peter F. Felfe, New York, N.Y., fractional part interest to each
Filed May 18, 1970, Ser. No. 38,084
Int. Cl. G11b 23/18; H04h 5/00; H01j 7/02
U.S. Cl. 179—100.1 TD
22 Claims

ABSTRACT OF THE DISCLOSURE

A method and apparatus for accurately reproducing in a first region a sound pattern representative of a sound pattern occuring in a second region comprising producing a first signal representing the total sound pressure at a point in the second region, a second signal representing the relative amount of sound energy flowing in a first path across the region and a third signal representing the relative amount of sound energy flowing in a second path across the region. The signals are combined to produce at least first and second output signals wherein the first output signal is directly proportional to the first and second signals and the second output signal is directly proportional to the first and third signals. Decoding is provided to decode the first and second output signals to produce the sound pattern in the first region.

This invention relates generally to a method and a system for recording and for reproducing such recorded information and, more particularly, pertains to a method and a system which is adapted to record and to produce sound variations accurately.

Audio engineers have attempted to utilize a multitude of different recording systems to accurately or faithfully reproduce concert hall sounds in the average home from a recording. For example, stereophonic sound systems have gained widespread acceptance over monophonic systems because they are believed to more accurately give the listener a sensation of distance and breadth; however, these systems are at best only an approximation and they fall far short of the mark. The reason for this is that sound in the concert hall comes from all directions toward the listener, in a precise pattern of time and loudness which is different for each hall. No system which controls only the sound originating from one side of a room can therefore reproduce concert hall acoustics naturally. Accordingly, it has been recently been proposed to provide a "quadrophonic" sound system to more accurately reproduce concert hall sounds in the room.

This latter type of system utilizes a multi-channel recording such as four separate channels of recorded information which are respectively applied to four spatially related speakers. The recorded information is usually obtained from four correspondingly related microphones located in the vicinity of a hypothetical listener at the source of the sounds. The principles underlying this type of system, like the principles underlying the stereophonic (or stereo) sound system, are based on the fact that when synchronized sound is emitted from the speakers the desired directional effect will be achieved. However, unlike the stereo system, the quadrophonic system is able to faithfully reproduce sounds primarily because the acoustical effects of one concert hall can be superimposed upon the normal home listening area and override the subtle sensations produced by the acoustical properties of the average living room. Thus, the reproduced sounds of a quadrophonic system are a more satisfying approximation of the source sounds than a two-channel system could provide.

However, a serious drawback associated with the above multi-track recording of information is due to the fact that in those recording systems which have found greatest favor with home listeners, only a limited number of tracks are available for recording such information. More specifically, although special tape recording systems may be devised which will not pose any problems since four tracks are usually available, a disk record can normally only accommodate two recording tracks and accordingly, expensive and complex electronic equipment will be required to record or play more than two tracks on a record. This is unfortunate, as the disk record is lowest in cost, best in sound quality, and most widespread in use of home systems. While several systems have been proposed to accomplish the recording of quadrophonic information on disks. those systems which are compatible (equally audible with present unmodified two-channel equipment) destroy and cannot recover the original information with directional or amplitude accuracy.

Accordingly, an object of the present invention is to provide an improved recording system.

A more specific object of the present invention is to provide a recording system which faithfully reproduces sound variations.

Another object of the invention resides in the novel details of construction which provide a recording system of the type described which is compatible for use with existing components, including FM communication and tape two-channel systems.

A further object of the invention is the provision of a recording system which is efficient in operation and which utilizes a minimum of components.

Another object of the invention is to provide a recording system of the type described which has no appreciable distortion of the directional information even when subjected to complex musical passages.

Accordingly, a system constructed according to the present invention is adapted to record four channels of information respectively represented by a first second, third and fourth signal (which may be derived from respective microphones) on two recording tracks and comprises adding means for adding the first, second, third and fourth signals to produce a sum signal. First subtracting means is operable to subtract the second from the signal to produce a fifth signal and second subtracting means is operable to subtract the fourth signal from the third signal to produce a sixth signal. Combining means is provided which is responsive to the sum, fifth and sixth signals for producing a first output signal which is directly proportional to said fifth signal and a second output signal which is directly proportional to said sixth signal.

A further object of the invention is the provision of a method for accurately recording and reproducing sound variations.

Other features and advantages of the present invention will become more apparent from a consideration of the following detailed description when taken in conjunction with the accompanying drawings, in which:

FIG. 1 is a diagrammatic representation of a microphone arrangement utilized to illustrate the principles of the present invention;

FIG. 2 is a diagrammatic representation of a speaker arrangement similar to FIG. 1;

FIG. 3 is a schematic circuit wiring diagram, in block form, of an encoder constructed according to the present invention;

FIG. 4 is a schematic circuit diagram of a network which may be used in the encoder of FIG. 3;

FIG. 5 is a circuit diagram of a modified embodiment of an active voltage divider for use in the encoder of FIG. 3;

FIG. 6 is a circuit wiring diagram, in block form, of a decoder constructed in accordance with the present invention;

FIG. 7 is a schematic circuit wiring diagram of portions of the decoder shown in FIG. 6; and FIG. 8 is a modified embodiment of a decoder.

At this point, it is believed that a discussion of the characteristics of sounds per se will facilitate an understanding and an appreciation of the present invention. Accordingly, if a person sits in a concert hall or a theatre and listens to music or the like, the music appears to surround the listener since it is reflected from the walls, ceiling and floor in addition to coming from the stage. However, at any one point in time the sound is and appears to be coming from a single source or from a specific direction. The reason for this is due to the fact that while sound pressure is a scalar quantity, the sound intensity (that quality by which the ear and brain determine the direction from which a sound originates) is a vector quantity, and therefore has a direction as well as an amplitude. More specifically, while sound intensities from all the points in a concert hall approach the listener from different directions, the virtual location of the ear-brain system may be considered as a point in space for which the biological system performs a vector addition so that the net result is that the listener, at any one moment, discerns a single sound source having a specific amplitude and direction, the amplitude and direction corresponding to that of the resultant intensity vector. It is to be understood that this resultant amplitude and direction are continuously varying with time since the component sound intensities at the point of interest are likewise varying with time. Accordingly, the present invention relates to a system which records information relating to such sound intensity resultant vector and reproduces the same in a home listening area.

In accordance with conventional vector notation, a vector quantity may be represented by its so-called "X" and "Y" components wherein the "X" and "Y" components lie along mutually perpendicular axes. Thus, in its most basic sense, the present invention records information relating the total sound pressure to the "X" and "Y" components of the resultant intensity vector in respective tracks. Since only the ratio of these component values is conserved in recording, additional signal information must be applied to one or the other of the tracks to essentially designate the polarity of the resultant (i.e., "+X" or "−X"; "+Y" or "−Y"). Moreover, since the ear does not actually detect intensities but only changes in direction of the intensity and sound pressure variations (i.e., changes in loudness), the actual information recorded is only proportional to the "X" and "Y" components of the resultant in view of the fact that this information is sufficient to reproduce a sound having the same direction as the original sound. Thus, the reproduced sound has the same orientation as the original sound and an amplitude (loudness) which is proportional to the original sound.

In accordance with the present invention, FIG. 1 illustrates an arrangement 10 of microphones which may be utilized to record the desired information. The arrangement 10 comprises four microphones respectively designated A, B, C and D which are positioned at the vertices of a square. The listener 12 or the hypothetical listener, as the case may be, is situated at the center of the square and the microphones face outwardly, away from the listener, along the respective axes. The recorded information is played back through an arrangement 14 comprising speakers $a$, $b$, $c$ and $d$ (FIG. 2) which are likewise located at the vertices of a square but which face toward the center 16 thereof. For the arrangement 10 and 14 respectively illustrated in FIGS. 1 and 2, wherein there is a direct correspondence between the positioning of the microphones and the speakers, the invention is operable to accurately reproduce the sounds heard by the listener 12 at the center 16 of the arrangement 14. However, it is to be noted that this is by way of example only and is not to be interpreted as being a limitation of the present invention. That is, a rectangular or other geometric arrangement of elements may be utilized and simple compensation methods used in playback to conserve the information. Alternatively, an exact correspondence between the geometry of the microphones and the geometry of the speakers need not be maintained as where it is desired to emphasize certain portions of an orchestra, etc.

Using conventional vector notation as noted above, the microphones A and D may be though of as lying along the "+X" and "−X" axes, respectively, similarly, the microphones B and C lie along the "+Y" and "−Y" axes, respectively. The speakers $a$, $b$, $c$ and $d$ lie along corresponding axes. It will be obvious, from a consideration of FIG. 2, that only two speakers need be on at any one time to produce a vector in a desired quadrant. For example, in order to produce a sound in the quadrant bounded by the "+X" and "+Y" axes, only the speakers $c$ and $d$ need be on. Hence, as noted in greater detail below, the presence or absence of a keying signal is utilized to actuate the operation of the desired speaker pair.

The recording portion of the present system includes an encoder designated generally by the reference numeral 18 in FIG. 3 and comprises an adder 20 which sums the output signals of microphones A, B, C and D and produces an output signal Z on a lead 22. This signal Z represents the total sound pressure reaching the listener 12. More specifically, and sound pressure reaching the respective microphones is converted into a signal having an amplitude and polarity related to the sound pressure reaching that particular microphone. Since sound pressure is a scalar quantity these signals may be summed to obtain the total sound pressure. Information relating to the direction in which the sound energy passes the listener 12 is obtained in the manner described below.

Thus, the signal from microphone A is applied to a full-wave rectifier 24. The signal from microphone D is also applied to a full-wave rectifier 26. The output signals from rectifiers 24 and 26 are applied to the respective input terminals of a differential or difference amplifier 28 which subtracts the signal from rectifier 26 from the signal from rectifier 24. Accordingly, the output signal of the amplifier 28 which appears on the lead 30 will represent the value $|A|-|D|$ where $|A|$ and $|D|$ are the absolute values of the signals produced by the microphones A and D. Reference to FIG. 1 shows that this signal appearing on the lead 30 represents the absolute magnitude of the "X" component of the sound vector.

Similarly, the signals from microphones B and C are applied to respective full-wave rectifiers 32 and 34. The output signals from rectifiers 32 and 34 are applied to the respective input terminals of a differential amplifier 36 which subtracts the output of rectifier 34 from the output of rectifier 32. Thus, the amplifier output signal which appears on a lead 38 represents the quantity $|B|-|C|$ where $|B|$ and $|C|$ are respective absolute values of the signals from microphones B and C. Reference to FIG. 1 shows that the signal on lead 38 represents the absolute value of the "Y" component of the sound vector.

The differential amplifier 28 may be replaced by the single resistive network shown in FIG. 4. Thus, equal valued resistors 40, 42 and 44 are connected together between input terminals 46 and 48. The signal from rectifier 24 is applied to terminal 46 and the signal from rectifier 26 is applied to terminal 48. The signal appearing between output leads 50 and 52, which are respectively connected to the ends of the resistor 42, will correspond to the signal appearing on the lead 30 which represents the quantity $|A|-|D|$. A similar network may be provided for the amplifier 36.

As noted above, only the absolute values of the "X" and "Y" components of the vector are represented by the signals on the respective leads 30 and 38. Additional information must be supplied to locate the quadrant in which the vector lies. Accordingly, connected to the lead 38 is a polarity detector circuit 54. The detector 54 produces an output signal when the input signal on the lead 38 is negative. The output signal from detector 54 is applied to a key signal generator 56 which produces a key signal on a lead 58 in response to the detector signal.

As will be obvious from a consideration of FIGS. 1 and 3 the presence of the key signal indicates that microphone C is receiving a greater amount of energy than microphone B (i.e., the quantity $|B|-|C|$ is negative) and therefore the vector lies in either the top or right-hand quadrant, as taken in FIG. 1 (i.e., the "Y" component of the vector is positive). To put this another way, a component of the resultant sound energy passes the point 12 in a direction indicated by the arrowhead 15.

The sound pressure signal Z on the lead 22 and the "X" and "Y" vector component signals on the respective leads 30 and 38 are applied to an active voltage divider 60. The voltage divider 60 includes an operational amplifier or multiplying amplifier 62 which receives the signals on the leads 22 and 30 and multiplies these signals to produce a signal on a lead 64 connected to the output thereof which is the product of the input signals. Thus, the signal appearing on the lead 64 corresponds to the Z signal multiplied by the "X" component of the vector or $Z(|A|-|D|)$.

In a like manner, the signal on the lead 22 and the signal on the lead 38 are applied to an operational or multiplying amplifier 66, the output signal of which appears on a lead 68 and represents the product $$Z(|B|-|C|).$$

Additionally, the signals on the leads 30 and 38 are applied to a summing amplifier 70 through respective buffer amplifiers 72 and 74. The output of the amplifier 70 appears on a lead 76 and represents the sum of the "X" and "Y" components of the vector or $$(|A|-|D|)+(|B|-|C|)$$

The lead 76 is connected to one input terminal of an operational or dividing amplifier 78, the other input terminal of which is connected to the lead 64. The amplifier 78 is operable to divide the signal on the lead 64 by the signal on the lead 76. Thus, the output signal L on a lead 80, which is connected to the output terminal of the amplifier 78, represents the quantity $Z(|A|-|D|)$ divided by the "X" and "Y" components of the vector or $$Z(|A|-|D|)/(|A|-|D|)+(|B|-|C|)$$

The lead 76 is also connected to one input terminal of an operational or dividing amplifier 82, the other input terminal of which is connected to the lead 68. The amplifier 82, like the amplifier 78, is operable to divide the signal appearing on the lead 68 by the signal appearing on the lead 76 and to produce the quotient on a lead 84 as a signal R. Thus, the signal R represents the quantity $$Z(|B|-|C|)/(|A|-|D|+(|B|-|C|)$$

Thus, the L and R signal amplitudes are in the same ratio as the X and Y components of the resultant vector and the sum of the L and R signals is proportional to the total sound pressure at 12. To put this another way the L signal is directly proportional to the signal on lead 30 and the R signal is directly proportional to the signal on the lead 38.

It will now be obvious that the L and R output signals contain information relating to the total sound pressure of the original sound (i.e., the Z signal) modified by information which indicates the direction of the original sound. Additionally, the key signal, when present, may be modulated on the signal on the lead 84. The key signal may comprise a 15 kHz. signal an inaudible or, in the case of recording on a tape medium, a signal near the high end of the audio spectrum. The L and R signals (including the key signal) are applied to the two channels of a recorder 86 which may comprise a tape recorder or the like. Alternatively, the signals may be transmitted by broadcasting the same or by other means to a decoder. It is emphasized that all the information necessary to accurately reproduce a representation of the original sounds may be recorded on two tracks.

FIG. 5 shows a modified embodiment of a voltage divider which may be used in place of the divider 60. Thus, the divider of FIG. 5 comprises the series connection of transistors 88 and 90. More specifically, the collector electrode of the transistor 88 is connected to an input terminal 92 through a resistor 94. The terminal 92 is adapted to be connected to the lead 22 so that the Z signal appears at the terminal 92. The emitter electrode of the transistor 88 is connected to the collector electrode of the transistor 90, the emitter electrode of which is grounded.

The base electrodes of the transistors 88 and 90 are respectively connected to the leads 30 and 38 so that the "X" and "Y" components $(|A|-|D|)$ and $(|B|-|C|)$, respectively, are applied to the transistors. An output lead 96 is connected to the collector of the transistor 88 and an output lead 98 is connected to the collector of the transistor 90. Thus, the L signal appears between the leads 96 and 98 and the R signal appears between the lead 98 and ground. The key signal may be applied to the lead 98 to modulate the R signal as noted above.

The decoder which retrieves the recorded information and applies the same to the speakers $a$–$d$ to accurately reproduce the direction and proportional loudness of the original sound is shown in FIG. 6 and is designated generally by the reference numeral 100. The lead 102 is connected to the output circuit of channel $a$ through a switch 106A and the lead 104 is connected to the output circuit of channel $b$ through a switch 106B. The output circuits may comprise appropriate amplifiers and the like which, in turn, are respectively connected to the speakers $a$ and $b$ of FIG. 2.

Connected to the lead 104 is a phase inverter 108 which inverts the R signal 180° to produce a signal —R and applies the same to channel $c$ through a switch 106C. Similarly, a phase inverter 110 is connected to the lead 102 and is operable to invert the L signal 180° to produce a —L signal. The —L signal is applied to the channel $d$ through a switch 106D. The end components in channels $c$ and $d$ are, of course, the respective speakers $c$ and $d$ of FIG. 2.

The switches 106A–106D are single-pole single-throw switches which are controlled by a switching matrix 106. The switching matrix, in turn, is responsive to signals from a polarity detector 112 and a key signal detector 114. The polarity detector 112 is connected to the leads 102 and 104 and receives the L and R signals at its input terminals. The key signal detector 114 is connected to the lead 104 and detects the presence of the key signal which may be modulated on the R signal. Although actual switches 106A–106D have been shown and described it will be obvious that any device may be utilized which will attenuate signals associated with those speakers which are not to be energized at a particular moment and which will pass signals to those speakers which are to be energized. Moreover, the output circuits of the respective channels may incorporate means by which switching may be accomplished at either high or low impedance. The polarity detector 112 is operable to produce an output signal when the R and L signals are of the same polarity and does not produce a signal when they are of opposite polarity. The key signal detector 114 is operable to produce an output signal when the key signal is detected and does not produce any signal in the absence of a key signal.

The switching matrix 106 may perform any one of four functions in response to the presence or absence of signals from the detectors 112 and 114. More specifically, if the R and L signals are of the same polarity and no key signal is detected, the detector 112 produces an output signal and the matrix closes switches 106A and 106B to cause the L and R signals to be applied to speakers a and b, respectively. If, instead, the key signal is detected, the detector 114 also produces an output signal and the switching matrix 106 closes switches 106C and 106D instead of 106A and B. Accordingly, the −R and −L signals are applied to speakers c and d. If the R and L signals are of opposite polarity and no key signal is detected, neither detector produces an output signal and matrix 106 closes switches 106B and 106D. On the other hand, if the key signal is detected and the detector 114 produces an output signal, the matrix closes switches 106A and 106C to cause the L and −R signals to be applied to the a and c speakers, respectively.

An example of the polarity detector 112 and the switching matrix 106 is shown in FIG. 7. More specifically, the polarity detector 112 includes an NPN transistor 116, the collector electrode of which is connected to a source 118 having a potential +E through a resistor 120 and the emitter electrode of which is connected to the collector electrode of an NPN transistor 122. The emitter electrode of the transistor 122 is connected to ground through a resistor 124. The base electrode of the transistor 116 is connected to the lead 102 and receives the L signal thereon the base electrode of the transistor 122 is connected to the lead 104 and receives the R signal thereon.

Similarly, the emitter electrode of a PNP transistor 126 is connected to the source 118 through a resistor 128 and the collector electrode thereof is connected to the emitter electrode of a PNP transistor 130. The collector electrode of the transistor 130 is connected to ground through a resistor 132 and the base electrode thereof is connected to the lead 104 via a lead 134. The base electrode of the transistor 126 is connected to the lead 102 via a lead 136. Additionally, a relay winding 138 in switching matrix 106 is connected between the emitter electrodes of the transistors 116 and 130. The transistors 116, 122, 126 and 130 are preferably high gain transistors which saturate at very low input signals and, in practice, each transistor may comprise a Darlington pair. Moreover, the value of the resistors 120, 124, 128 and 132 are equal.

A consideration of the above-described circuit shows that if the L and R signals are of the same polarity no current flows through the relay winding 138. On the other hand, if the signals are of opposite polarity, the relay winding 138 is energized. To be more specific, if L and R are both positive, transistors 116 and 122 are both conducting and the potential at the emitter electrode of transistor 116 is determined by the values of resistors 120 and 122 (assuming negligible voltage drop across the transistors). Since these resistors are equal, the voltage at the emitter electrode will be ½E. For the same set of conditions, transistors 126 and 130 are cut off. Assuming the impedance of these transistors are equal in cut-off the potential at the emitter electrode of the transistor 130 will similarly be ½E. Hence, no current flows through the winding 138 since both ends of the winding are at the same potential. If, on the other hand, the L and R signals are both negative, then transistors 126 and 130 will conduct and transistors 116 and 122 will be cut-off. Hence, both ends of the relay winding 138 will again be at a potential of ½E and the relay winding will remain deenergized. Thus, as long as the L and R signals are of the same polarity, the relay winding 138 remains deenergized.

However, if the L and R signals are of opposite polarity a current will flow through the relay winding 138. More particularly, assuming, for example, that the L signal is positive and the R signal is negative transistor 116 will be in saturation whereas transistor 122 will be cut-off. Therefore, the potential at the emitter of transistor 116 will be equal to E. Additionally, transistor 126 will be cut-off by the positive L signal applied to its base and transistor 130 will be in saturation due to the negative R signal applied to its base. Therefore, the emitter electrode of the transistor 130 will be at ground potential. As a result, a potential difference will exist across the relay winding 138 and the winding will be energized. If the conditions are reversed and the L signal is negative and the R signal is positive, it is obvious that the formally cut-off transistors will conduct and the formally conducting transistors will be cut-off. Hence, the same potential difference will exist across the relay winding 138 and the winding will be energized.

Summarizing the operation of the polarity detector 112, the relay winding 138 is deenergized when the L and R signals are of the same polarity and is energized when the signals are of opposite polarity.

The switching matrix 106 includes relay windings 140A, 140B, 140C and 140D which respectively control the operation of the associated switches 106A, 106B, 106C and 106D. That is, when any one of the windings 140A–140D is energized the associated switch 106A–106D closes. For example, if relay winding 140B is energized the switch 106B closes.

The relay windings 140A–140D are energized by a source of potential 142 having one terminal connected to ground and the other terminal connected to the armature 144A of a relay 144. The winding of the relay 144 is connected between the key signal detector 114 and ground and is adapted to be energized by the output signal from the detector 114 (i.e., when a key signal is detected). The armature 144A normally engages a contact 144B but is operable to be disengaged therefrom and to engage a contact 144C when the winding of the relay 144 is energized.

The contact 144B is connected to one end of the relay winding 140B (the other end of which is grounded) and to an armature 138A of the relay or relay winding 138 by a lead 146. The contact 144C is connected to one end of the relay winding 140C (the other end of which is grounded) and to an armature 138B of the relay 138 by a lead 148.

The armature 138A normally engages a contact 138C and is operable to be moved into engagement with a contact 138D when the relay or relay winding 138 is energized. The contact 138C is connected to one end of the relay winding 140A (the other end of which is grounded) by a lead 150. The contact 138D is connected to one end of the relay winding 140D (the other end of which is connected to ground) by a lead 152.

In a like manner, the armature 138B normally engages a contact 138E and is operable to be disengaged therefrom and to engage a contact 138F when the relay 138 is energized. The contact 138F is connected by a lead 154 to the lead 150. The contact 138E is connected by a lead 156 to the lead 152.

As noted above, if the polarity of the L and R signals are the same the relay 138 is deenergized and armatures 138A and 138B respectively engage contacts 138C and 138E. If the polarity of the signals are different, the relay winding 138 is energized and the armatures 138A and 138B respectively engage contacts 138D and 138F. Additionally, in the absence of a key signal relay 144 is deenergized and armature 144A engages contact 144B. In response to a key signal relay 144 is energized and armature 144A engages contact 144C.

It will now be obvious that the switching matrix 106 shown in FIG. 7 performs the functions specified above in the description of FIG. 6. That is, for example, if the L and R signals are of the same polarity and no key signal is detected, relay 140B will be energized by the source 142 through armature 144A and contact 144B and the lead 146. Additionally, relay 140A will be energized through the circuit including the energized lead 146, armature 138A, contact 138C and lead 150. Hence, switches 106A and 106B close to apply the appropriate signals to the output circuits of channels *a* and *b*.

However, if both the key signal is present and the L and R signals are of opposite polarity, both relay winding 144 and relay winding 138 will be energized, as noted above. Thus, relay winding 140C will be energized from the source 142 through the armature 144A, contact 144C and lead 148. Additionally, relay winding 140A will be energized via the energized lead 148, the operated armature 138B, contact 138F and lead 154. Hence, switches 106C and 106A close thereby to apply the appropriate signals to the output circuits of channels *c* and *a*.

Moreover, it will be obvious from the preceding description of the operation of the matrix 106 that when the key signal is present and the L and R signals are of the same polarity, relay windings 140C and 140D will be energized and switches 106C and 106D will close. If the L and R signals are of opposite polarity and no key signal is detected relay 138 will be activated thereby energizing relays 140B and 140D to close switches 106B and 106D.

It is believed that the following examples of operation of the present system will clearly show the reason for the above-described operation of the matrix 106 and for the inversion of the signals applied to channels *c* and *d*.

In operation, it is assumed that at a particular point in time the resultant of the sound energy passing the point 12 produces a vector 115, as shown in FIG. 1, which makes an angle $\alpha$ with respect to the "+X" axis and an angle $\beta$ with respect to the "+Y" axis, where $\alpha$ is greater than $\beta$. This means that the signals produced by microphones C and D will be greater than the signals produced by microphones A and B, and, further that the "Y" component of the resultant is greater than the "X" component. Thus, the quantities $(|A|-|D|)$ and $(|B|-|D|)$ will both be negative (and of the same polarity). Additionally, since the signal on the lead 38 is negative a key signal appears on the lead 58. The encoder of FIG. 3 operates on the singals produced by microphones A, B, C and D in the manner indicated above and produces the L and R signals where, in this particular case, R is greater than L since the "Y" component $(|B|-|C|)$ of the vector is greater than the "X" component $(|A|-|D|)$ and both L and R are negative since both quantities $(|A|-|D|)$ and $(|B|-|C|)$ are negative.

These L and R signals together with the key signal are applied to the decoder of FIG. 6. The polarity detector detects that both signals are of the same polarity and the key signal detector detects the key signal and, accordingly, the key signal detector produces an output signal. Hence switching matrix 106 operates to close switches 106C and 106D to cause the —R signal to be applied to channel *c* and the —L signal to be applied to channel *d*.

Since the sound pressure at point 12 of FIG. 1 is a scalar quantity and was represented by the signal Z, it is obvious that this same sound pressure will be reproduced at the center 16 of the arrangement 14. That is the —R signal $$\frac{Z(|A|-|D|)}{(|A|-|D|)+(|B|-|C|)}$$

and the —L signal $$\frac{Z(|B|-|C|)}{(|A|-|D|)+(|B|-|C|)}$$

when added together produce the quantity Z the original sound pressure. Moreover, since the signal applied to speaker *c* is proportional to the "Y" component $(|B|-|C|)$ of the vector 115 and the signal applied to the *d* speaker is proportional to the "X" component $(|A|-|D|)$ of the vector 115 it will be obvious that the sound emitted from the speakers *c* and *d* will produce a vector 116 which makes the same angles with the "X" and "Y" axes and therefore has the same orientation as the vector 115. Thus, the sound reproduced at the point 16 will be an accurate reproduction of the sound passing the point 12. Similar comments apply if the sound vector were found in any other quadrant. At this point it should be noted that the R and L signals are shifted 180° when applied to the *c* and *d* speakers to maintain polarities with respect to the original sound signals.

As another example, it is assumed that the resultant vector is as shown by the vector 118 in FIG. 1 which makes an angle of 45° with respect to the "+X" and "—Y" axes. This means that the signals produced by the microphones B and D are greater than the signals produced by the micropohnes A and C, and the quantity $|B|-|C|$ is positive and equal in magnitude to the negative quantity $|A|-|D|$. Since the signal on lead 38 is positive; no key signal is generated.

The encoded signals are received by the decoder. Since the polarities of the R and L signals are directly related to the polarities of the $|B|-|D|$ and $|A|-|D|$ signals, as noted above, the detector 112 detects that R and L are of different polarities and, further, no key signal is detected. Hence, no output signals are produced by detector 112 and the matrix 106 operates to close switches 106B and 106D whereby the R signal is applied to speaker *b* and the —L signal is applied to speaker *d*. Since the magnitude of these signals are equal, it is obvious that these speakers will produce a resultant vector oriented as shown by the vector 120 which makes a 45° angle with respect to either the "+X" or "—Y" axes.

As a further example, it is assumed that the resultant sound is directed along the "γ" axis as indicated by the arrowhead 156 in FIG. 1. Hence, only the B microphone produces a signal. For this case no key signal will be generated and, since the L signal is directly proportional to the quantity $(|A|-|D|)$ which is zero, no L signal will be produced.

When this signal is received by the decoder 100, the switching matrix 106 is activated to close switches 106B and 106D. Since no L signal is present only the *b* channel will receive a signal (the R signal). Thus, the entire signal will be produced by speaker *b* so that the orientation of the reproduced sound is the same as that of the original sound.

In some cases it is possible that sudden changes in the sound will not permit the switching to be accomplished before the sound again varies. Accordingly, FIG. 8 illustrates a modified embodiment of a decoder which is operable to permit switching to be completed prior to the application of the L and R signals to the respective output circuits of the channels. The decoder of FIG. 8 is similar to the decoder of FIG. 6 and only the differences are shown. Like numbers in the figures indicate identical elements.

As in the decoder of FIG. 6, the L and R signals of the decoder of FIG. 8 are applied to the polarity detector 112 and the R signal is applied to the key signal detector 114. The output terminals of the detectors 112 and 114 are applied to the switching matrix. However, the L and R signals pass through a delay circuit 180 prior to being applied to the leads 102 and 104 and the inverters 108 and 110. Thus, the delay circuit insures that switching by the matrix 106 will be completed before the audio signals reach the respective speakers.

Accordingly, a recording system has been disclosed which occupies two recording tracks to record information and which is operable to accurately reproduce the recorded information. Moreover, it will be obvious that even in the absence of the decoder of FIG. 6, a recording produced by the encoder of FIG. 3 is compatible for use with existing two-track playback equipment.

While preferred embodiments of the invention have been shown and described herein it will be obvious that numerous omissions, changes and additions may be made in such embodiments without departing from the spirit and scope of the present invention. For example, a consideration of above system reveals the fact that the information to be recorded may be obtained in any manner as from a four track recording rather than a microphone arrangement as in FIG. 1, thereby providing a means for condensing four channels of information into two recording tracks. Moreover, the electro-mechanical devices of FIG. 7 may be replaced by appropriate semiconductor elements.

What is claimed is:

1. Apparatus for reproducing information over a defined region from first and second output signals wherein said second output signal selectively includes a third output signal comprising decoding means for reproducing said information from said first and second output signals comprising first, second, third and fourth transducing means for converting signals supplied thereto into a preselected form of energy; first connecting means for connecting said first output signal with said first transducing means, second connecting means for connecting said second output signal with said second transducing means, phase shifting means for shifting said first and second output signals 180°; third connecting means for connecting said shifted first output signal to said third transducing means; fourth connecting means for connecting said shifted second signal to said fourth transducing means; and switching means responsive to the polarity of said first and second and the third output signal for selectively operating two of said first, second, third and fourth connecting means at any one time, said first and third transducing means being in facing relationship to each other and second and fourth transducing means being in facing relationship to each other.

2. Apparatus as in claim 1, in which said switching means comprises polarity means for producing a polarity signal in response to said first and second output signals being of the same polarity, detection means for producing a key signal in response to said third output signal in said second output signal, and control means for operating: said first and second connecting means in response to said polarity signal, said third and fourth connecting means in response to the concurrence of said polarity and key signals, said second and third connecting means in response to the absence of said polarity and key signals, and said first and fourth connecting means in response to the presence of only said key signal.

3. A method for producing four channels of information respectively represented by a first, second, third and fourth electrical signal on two tracks comprising adding said first, second, third and fourth signals to obtain a sum electrical signal; subtracting the absolute values of said first and second electrical signals to obtain a fifth electrical signal having a polarity determined by the relative magnitudes of said first and second signals; subtracting the absolute values of said third and fourth electrical signals to obtain a sixth electrical signal having a polarity determined by the relative magnitudes of said third and fourth signals; and combining said sum, fifth and sixth electrical signals to produce first and second output electrical signals wherein said first output signal is directly proportional to said sum and fifth signals and the polarity of said fifth signal and said second output signal is directly proportional to said sum and sixth signals and the polarity of said sixth signal, and producing a third output signal when said sixth signal is of a preselected polarity, mutiplying said sum signal by said fifth signal divided by the sum of said fifth and sixth signals to obtain said first output signal, and multiplying said sum signal by said sixth signal divided by the sum of said fifth and sixth signals to obtain said second output signal, and recording said first output signal and said second output and third output electrical signals, respectively, on two tracks.

4. The method of claim 3, including the step of producing a third output electrical signal when the sixth signal is of a preselected polarity, and incorporating said third output signal in said second output signal.

5. The method of claim 3 and producing said channels of information represented by said first and second output signals comprising shifting said first output signal by 180°, shifting said second output signal 180°; detecting said third signal; and selectively applying said first, second, shifted first and shifted second output signals to respective first, second, third and fourth transducers in a pattern determined by the polarity of said first and second output signals and the detection of said third signal.

6. The method of claim 5, including the steps of detecting the polarity of said first and second output signals and the presence of said third output signal, and applying said first and second output signals, respectively to said first and second transducers when said first and second output signals are of the same polarity and said third signal is absent, applying said shifted first and second output signals, respectively, to said third and fourth transducers when said first and second output signals are of the same polarity and said third output signal is present, applying said second output and said shifted output signal, respectively, to said second and fourth transducers when said first and second output signals are of opposite polarity and said third output signal is not present, and applying said first and shifted output signal, respectively, to said first and third transducers when said first and second output signals are of opposite polarity and said third output signal is detected.

7. A method for producing in a first region a longitudinal wave energy flow pattern occurring in a second region comprising providing transducers to convert said energy into electric signals, placing said transducers at the respective ends of a first path in said second region, placing others of said transducers at the ends of a second path in said second region wherein said first path intersects said second path, producing a first signal from said transducers representing the total amplitude of a quantity related to said energy present at said second region, producing a second signal from said transducers associated with said first path which represents the net energy flowing in said first path and the direction thereof, producing a third signal from said transducers associated with said second path which represents the net energy flowing in said second path and the direction thereof, combining said first, second and third signals to produce first and second output signals wherein said first output signal is proportional to said first and second signals and said second output signal is proportional to said first and third signals, producing a fourth signal when the energy flow in said second path is in a preselected direction, decoding said first and second output signals, and applying said decoded first and second output signals in a preselected sequence to transducers in said first region under control of said fourth signal and the direction of flow of energy in said first and second paths to produce in said first region said energy flow pattern.

8. The method of claim 7, including the step of recording said first and second output signal on a recording medium.

9. The method of claim 7, in which said decoding includes selectively applying said first and second output signals to respective transducers surrounding said first region in a preselected sequence depending upon the polarity of said first and second output signals in the presence of said fourth signal to convert said signals into said energy flow pattern.

10. The method of claim 7, said decoding including the steps of positioning the first pair of output transducers at the boundaries of said first region at opposite ends of a third path corresponding to said first path, positioning the second pair of output transducers at the boundaries of said first region at the end of the fourth path corresponding to said second path, applying said first output signal to one of said first pair of output transducers and a phase shifted first output signal to the other one of said first pair of output transducers, applying said second output signal to one of said second pair of output transducers and a phase shifted second output signal to the other one of said second pair of output transducers, comparing said first and second output signals to determine if they are of the same polarity and detecting for the presence of said fourth signal, energizing a first two of said output transducers if said first and second signals are of the same polarity in the absence of said fourth signal and a second two of said output transducers if the fourth signal is present, and energizing a third two of said output transducers if said first and second output signals are of different polarity in the absence of said fourth signal and a fourth two of said output transducers if said fourth signal is present and said first and second output signals are of opposite polarity.

11. The method of claim 10, including the step of delaying the energization of said transducers until said first and second signals have been compared and said step of detecting for the presence of said fourth signal has been completed.

12. The method of claim 7, including the steps of multiplying said first and second signals and multiplying said first and third signals, and dividing said multiplied signals by the sum of said second and third signals to obtain said first and second output signals.

13. The method of claim 12, in which said first signal represents the total sound pressure at a preselected area in said first region, said second signal represents the amplitude and direction of the sound intensity in said first path, said third signal represents the amplitude and direction of said sound intensity in said second path, and said decoding includes the step of decoding said first and second output signals to produce in said first region the direction of the intensity of the sound in said second region.

14. A recording system for recording four channels of information respectively represented by a first, second, third, and fourth signal on two tracks wherein said first and second signals represent acoustic energy flowing in a first path in a region and said third and fourth signals represent acoustic energy flowing in a second path in said region and wherein said first path intersects said second path, comprising adding means for adding said first, second, third and fourth signals to produce a sum signal; first subtracting means for subtracting said second signal from said first signal to produce a fifth signal the polarity of which represents the direction of energy flow and the amplitude of which represents the magnitude of the net energy in said first path; second subtracting means for subtracting said fourth signal from said third signal to produce a sixth signal the polarity of which represents the direction of energy flow and the amplitude of which represents the magnitude of the net energy in said second path; and combining means responsive to said sum, fifth and sixth signals for producing a first output signal which is proportional to the amplitude and polarity of said fifth signal and a second output signal which is proportional to the amplitude and polarity of said sixth signal, and polarity means responsive to a preselected polarity of said sixth signal for producing a third output signal and incorporating said third output signal in said second output signal.

15. A recording system as in claim 14, in which said first and second subtracting means each comprise a pair of rectifiers each adapted to rectify a respective one of the signals to be subtracted, and an operational amplifier for subtracting one of said named signals from the other named signal.

16. A recording system as in claim 14, in which said combining means includes means for multiplying said sum signal by said fifth signal divided by the sum of said fifth and sixth signal to produce said first output signal, and means for multiplying said sum signal by said sixth signal divided by the sum of said fifth and sixth signals to produce said second output signal.

17. A recording system as in claim 14 and recording means for recording said first output signal in a first track and said second output signal in a second track.

18. A recording system as in claim 14 in which said first, second, third and fourth input signals are proportional to energy in a first region, said system further comprising first and second transducers positioned at opposite ends of said first path across said first region and being operable to respectively produce said first and second signals in response to energy flowing in said first path, and third and fourth transducers positioned at opposite ends of said second path across said first region and being operable to respectively produce said third and fourth signals in response to energy flowing in said second path.

19. A recording system as in claim 18 in which said first and second paths are perpendicular to each other, and said first, second, third and fourth transducers are microphones whereby the signals produced thereby are proportional to the sound pressure in said first region.

20. A recording system as in claim 14, and decoding means for reproducing said information from said first and second output signal which incorporates said third output signal comprising first, second, third and fourth transducing means for converting signals applied thereto into acoustic energy; first connecting means for connecting said first output signal with said first transducing means, second connecting means for connecting said second output signal with said second transducing means; phase shifting means for shifting said first and second output signals 180°; third connecting means for connecting said shifted first output signal to said third transducing means; fourth connecting means for connecting said shifted second signal to said fourth transducing means; fourth connecting means for connecting said shifted signal to said fourth transducing means; and switching means responsive to the polarity of said first, and second output signals and the presence of third output signal for selectively operating two of said first, second, third and fourth connecting means at any one time.

21. A recording system as in claim 20, in which said switching means comprises polarity means for producing a polarity signal in response to said first and second output signals being of the same polarity, detection means for producing a key signal in response to said third output signal in said second output signal, and control means for operating: said first and second connecting means in response to said polarity signal, said third and fourth connecting means in response to the concurrence of said polarity and key signals, said second and third connecting means in response to the absence of said polarity and key signals, and said first and fourth connecting means in response to the presence of only said key signal.

22. A recording system as in claim 21, in which said first, second, third and fourth transducing means each comprise a speaker; said first and second speakers being positioned to be in facing relationship to said fourth and third speakers, respectively.

References Cited

UNITED STATES PATENTS

| | | | |
|---|---|---|---|
| 3,217,080 | 11/1965 | Clark | 179—100.1 TD X |
| 3,110,769 | 11/1963 | Bertram | 179—100.1 TD X |
| 3,067,287 | 12/1962 | Percival | 179—100.1 TD X |

FOREIGN PATENTS

| | | | |
|---|---|---|---|
| 1,046,910 | 12/1953 | France | 179—100.4 ST |

STANLEY M. URYNOWICZ, JR., Primary Examiner

R. F. CARDILLO, JR., Assistant Examiner

U.S. Cl. X.R.

179—1 G, 15 BT, 100.2 MD, 100.3 B, 100.4 ST